(No Model.)

W. JOSLIN.
CAR WHEEL.

No. 316,977.  Patented May 5, 1885.

Witness
Jesse H. McMath
Thomas J. Carran

William Joslin Inventor
R.S. & A.P. Lacey
Attorneys

N. PETERS. Photo-Lithographer, Washington, D.C.

UNITED STATES PATENT OFFICE.

WILLIAM JOSLIN, OF CLEVELAND, OHIO.

CAR-WHEEL.

SPECIFICATION forming part of Letters Patent No. 316,977, dated May 5, 1885.

Application filed December 5, 1884. (No model.)

*To all whom it may concern:*

Be it known that I, WILLIAM JOSLIN, a citizen of the United States, residing at Cleveland, county of Cuyahoga, and State of Ohio, have invented new and useful Improvements in Car-Wheels for Railroads, of which the following is a specification.

My invention relates to improvements in car-wheels for railroads, with steel tire or other metal, and a center of one or more pieces made of steel, iron, or other metal.

The novelty of my invention consists in securely attaching the tire and center portion of the wheel together by means of an inclined or beveled spiral thread cut upon the side or face of an internal or center projecting flange of the tire, and corresponding inclined or beveled spiral thread cut upon the side or face of the outer portion of the center piece of the wheel.

The great improvement of my invention consists in putting the tire and center or internal part or parts of the wheel together firmly without bolts, without heating or shrinking the tire onto the center portion of the wheel, or the use of hydraulic pressure; also, in the event of the tire becoming fractured, the broken parts of the tire cannot get or slip out from their position or center portion of the wheel.

Figure 1:
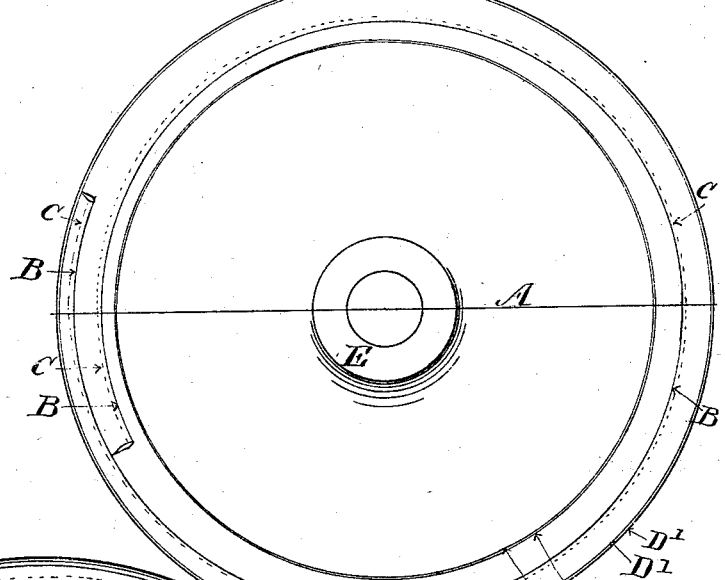
Figure 2:
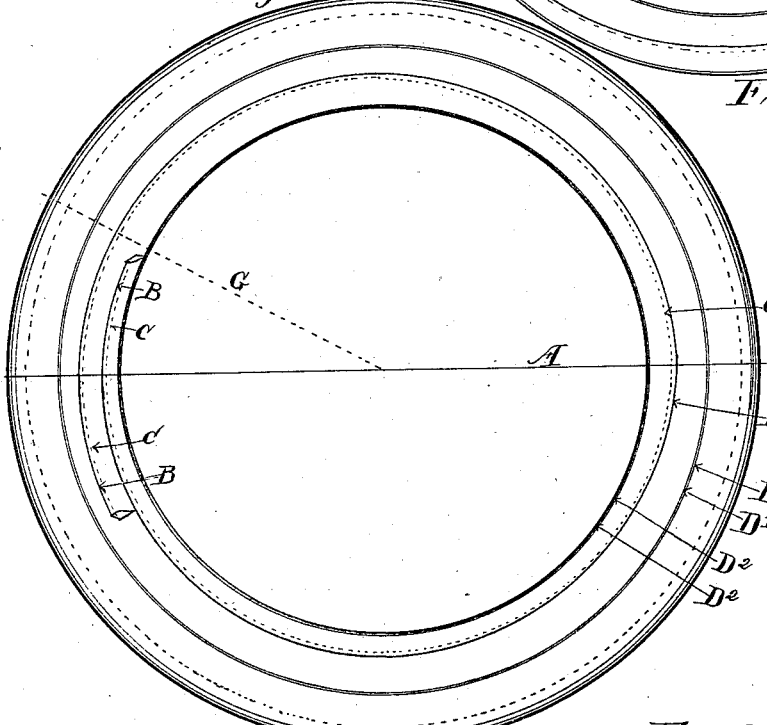
Figure 4:
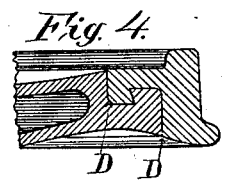
Figure 3:
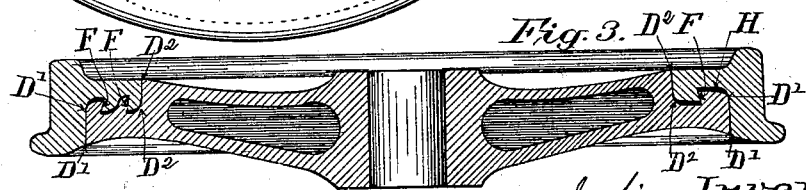

Figure 1 is the center portion of the wheel disconnected from the tire. Fig. 2 is the tire of the wheel disconnected from the center portion of the wheel, or hub and plate E, which in Fig. 1 forms one piece. Fig. 3 is a sectional elevation of the wheel, the tire and center of the wheel being firmly connected together by means of the inclined or beveled spiral threads. The section is through the center, as shown on lines A A in Figs. 1 and 2. Fig. 4 is a portion of section, Fig. 3, with some change in construction, as will be hereinafter described.

In Figs. 1 and 2, the letters B and C show the inclined or beveled spiral threads.

B B B in Figs. 1 and 2 show the top or projecting portion of the spiral threads.

The dotted lines C C C in Figs. 1 and 2 show the bottom of the inclined or beveled spiral threads.

The letter D in Figs. 1 and 2 show the inclined or beveled joints between the tire and center of the wheel.

D' D' in Figs. 1, 2, and 3 show the inclined or beveled outside joint between the tire and periphery of the center portion of the wheel.

$D^2 D^2$ show the joint between the internal flange of the tire and an inclined or beveled seat on the center portion of the wheel to receive the internal flange of the tire. Both joints are of the same angle, four degrees, more or less.

It will be readily seen that by forcing the two parts of the wheel together upon the corresponding inclines, D' D' and $D^2 D^2$, they make a firm and solid connection.

The radii of the inclined or beveled spiral threads of Figs. 1 and 2 are identical; but the inclines or bevels of the spiral threads are in opposite directions; while the top of the spiral thread cut in the plate or outer part of the central portion of the wheel inclines toward the center or hub E in Fig. 1, the top or outer portion of the spiral thread cut in the internal flange of the tire, projecting toward the center, Fig. 2, inclines outward toward the periphery of the wheel, and when put together produce a lock-joint, as shown at F F F in Fig. 3. Now, while the radii of the spiral threads of the two parts of the wheel are the same and the inclines of the spiral threads are in opposite directions, it will be readily seen, if Fig. 1 or center of the wheel is turned directly over so that the line A in Fig. 1 falls parallel upon the line A in Fig. 2, the inclined spiral threads will not go together, because the line B B B in Fig. 1 will fall upon the dotted line C C C in Fig. 2, causing the two spiral threads to lap upon each other. It therefore involves the necessity of turning Fig. 1 or center portion of the wheel back, so that the line A in Fig. 1 becomes coincident with the dotted line G in Fig. 2. In this position the relative position of the spiral radii of the thread in Fig. 1 has increased sufficiently to allow the spiral thread of Fig. 1, or center portion of the wheel, to fall into the spiral thread of Fig. 2, or tire of the wheel; then by turning Fig. 1, or center portion of the wheel, to its original position, or bringing the lines A A coincident again, it produces a dead or firm locking together of the two parts of wheel, as shown at F F F in Fig. 3.

The two parts of the wheel are so constructed that when the two inclined or beveled joints D' D' and D² D² are drawn firmly together by the action of the inclined spiral threads, which have much greater angles—say sixteen degrees, (more or less)—the spiral threads do not bottom; or, in other words, the outside portion of the spiral thread on the tire does not come in contact with the bottom portion of the spiral thread on the center of the wheel, nor does the outside portion of the spiral thread on the center portion of the wheel come in contact with the bottom portion of the spiral thread on the tire, which is shown by a space between the bottoms and tops of the two spiral threads, as seen at H in Fig. 3. The object obtained for leaving said space is in the event of the two inclined or beveled joints D' D' and D² D² wearing or becoming loose. In such an event the joints D' D' and D² D² can be drawn firmly together again by turning the two parts of the wheel in proper opposite directions. As the two inclined or beveled spiral threads are turned in the proper directions, or one turned and the other remaining stationary, they slip or draw together, hence bringing the two inclined joints D' D' and D² D² firmly and solid as before; but if the two parts of the wheel are constructed with the two joints D' D' and D² D² without inclining or being beveled, but slipping together parallel to the axis of the wheel closely from top to bottom, then in such a construction the inclined or beveled spiral threads will bottom, as seen in Fig. 4, and the pressure that takes place in the former construction between the inclined or beveled joints on the inside of the tire and outside of the center portion of the wheel will in the latter construction be transferred to the face or side of the internal flange of the tire and to the face or side of the outer portion of the center of the wheel, hence bringing the inclined spiral threads firmly to bottom, and leaving no space between the bottoms and tops of the spiral threads, as shown at H in Fig. 3. The greater portion of the labor or strain of the wheel will come upon the inclined or beveled spiral threads; but in the construction shown in Figs. 1, 2, and 3 the great labor and strain comes upon the solid beveled joints D' D' and D² D², and the wear of the parts can be taken up, while in the parallel connecting-joints, as shown in Fig. 4, the wear of the joints cannot be taken up.

In my invention the inclined or beveled spiral threads have great power to draw and hold the parts of the wheel together. In comparing the power of these spiral threads with the wedge, they are equal to a wedge of fifty to one in a wheel forty inches in diameter, or a wedge fifty inches long and one inch at the thick end. When this power is applied to draw the parts of the wheel together, there is no tendency to fracture the metal of the tire or center portion of the wheel, because the parts support each other. The only tendency is for them to slide together firmly, and the tendency to slide together is as the difference between the angle of the joints D' D' and D² D² and the angle of the spiral threads F F F. Stating the angle D' D' and D² D² at four degrees each, and the angle of the spiral threads F F F at sixteen degrees, the tendency of the spiral threads to draw the parts of the wheel together is as four to one; hence the radial pressure of the joints D' D' and D² D² is four times greater than the radial pressure of the joints F F F on the spiral threads, while the lateral or longitudinal pressure upon the joints F F F on the spiral threads is four times greater than the lateral or longitudinal pressure upon the joints D' D' and D² D², and bear a relative proportion in whatever difference may be made in the respective angles; but in constructing a wheel, as above mentioned, with joints parallel with the axis of the wheel, in the place of the inclined or beveled joints D' D' and D² D², the spiral threads slide down to bottom, and the radial pressure becomes nothing, and is transferred to the lateral or longitudinal pressure between the bottoms and tops of the inclined or beveled spiral threads.

One great improvement which results from the inclined or beveled spiral threads in my invention is, that in the event of the tire becoming fractured or broken the broken parts of the tire cannot be disengaged from the central portion of the wheel. This is readily seen from the fact that the angle of the spiral threads is so much greater than the angle of the inclined or beveled joints D' D' and D² D² in Figs. 1, 2, and 3, and the joints parallel with the axis of the wheel, Fig. 4, that the parts cannot get or slip out, the spiral threads acting together as dovetails, thus obviating great danger and damage, which follow the breakage of other wheels.

As a cautionary measure, one or more keys, rivets, or bolts may be put through the internal flange of the tire and center portion of the wheel in such relation to the spiral threads as to prevent the spiral threads from unscrewing or becoming loose.

After thus describing my invention, what I desire to secure by Letters Patent is—

1. A wheel having a tire and a center part or disk, said tire and center part being joined together by an interlocking thread-joint formed in approximately the plane of the wheel, substantially as set forth.

2. As a new and improved article of manufacture, a rim or tire for car-wheels, provided on one of its sides or faces with helically-disposed threads formed in approximately the plane of such tire, substantially as set forth.

3. The combination, with the tire having its inner face inclined or beveled outward, as described, and provided at or near one of its edges with an inwardly-projected flange, the inner edge of which is inclined in line parallel with the incline on the tire, and having on its inner face a helical thread projected toward the tire, whereby a semi-dovetail or curved mortise is provided, as shown, of a central disk or plate fitting snugly within and against the inner beveled face of the tire, and having on its side or radial face a shoulder and a helical thread arranged, conformed, and adapted to interlock with and bind against the inner face of the tire and against the inner edge of the radial flange, substantially as set forth.

WILLIAM JOSLIN.

Attest:
 JESSE H. MCMATH,
 THOMAS J. CARRAN.